United States Patent
Ragusa et al.

(10) Patent No.: US 9,058,214 B2
(45) Date of Patent: Jun. 16, 2015

(54) COMPUTER NETWORK, COMPUTER SYSTEM, COMPUTER-IMPLEMENTED METHOD, AND COMPUTER PROGRAM PRODUCT FOR MANAGING SESSION TOKENS

(75) Inventors: Riccardo Ragusa, Milan (IT); Alessandro Casillo, Naples (IT)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 420 days.

(21) Appl. No.: 13/409,367

(22) Filed: Mar. 1, 2012

(65) Prior Publication Data
US 2012/0226813 A1 Sep. 6, 2012

(30) Foreign Application Priority Data
Mar. 2, 2011 (EP) .................................. 11425051

(51) Int. Cl.
| | |
|---|---|
| *G06F 15/16* | (2006.01) |
| *G06F 9/50* | (2006.01) |
| *H04L 29/06* | (2006.01) |
| *H04L 29/08* | (2006.01) |

(52) U.S. Cl.
CPC .......... *G06F 9/5027* (2013.01); *H04L 63/0807* (2013.01); *H04L 63/123* (2013.01); *H04L 67/02* (2013.01); *H04L 67/142* (2013.01); *G06F 2209/5011* (2013.01); *G06F 2209/5016* (2013.01)

(58) Field of Classification Search
CPC .......... H04L 63/08; H04L 63/06; H04L 63/10; H04L 63/0823; G06F 21/33; H04W 76/021
USPC ..................................... 709/227–229
See application file for complete search history.

(56) References Cited

U.S. PATENT DOCUMENTS

| | | | |
|---|---|---|---|
| 7,366,912 B2 | 4/2008 | Sturgis | |
| 8,099,508 B2 * | 1/2012 | Mao et al. ................. | 709/229 |
| 2001/0047279 A1 * | 11/2001 | Gargone ....................... | 705/1 |
| 2004/0006711 A1 | 1/2004 | Krishnaswamy et al. | |
| 2008/0134228 A1 * | 6/2008 | Dion et al. .................. | 725/20 |
| 2008/0151767 A1 | 6/2008 | Moran et al. | |

(Continued)

FOREIGN PATENT DOCUMENTS

WO   WO 02/091140   11/2002

OTHER PUBLICATIONS

European Search Report, Application No. 11425051.7-2211, issued Oct. 5, 2011.

*Primary Examiner* — Brian J Gillis
*Assistant Examiner* — Michael A Keller
(74) *Attorney, Agent, or Firm* — Mannava & Kang, P.C.

(57) ABSTRACT

A computer network for managing session tokens may include a client operable to run a client application; a web server hosting at least one web service; and a session token manager. The session token manager may be operable to receive a check out message along with user credentials from the client application, wherein the user credentials identify a user operating the client application; process the check out message to determine a session token from a pool of session tokens managed for the user; and send a token identifier (token ID) to the client application pointing to the determined session token, wherein the session token can be used by the client application to point to and/or to re-use a previously established session with the web service without re-establishing a new session.

14 Claims, 4 Drawing Sheets

(56) References Cited

U.S. PATENT DOCUMENTS

| | | |
|---|---|---|
| 2008/0168539 A1 | 7/2008 | Stein |
| 2008/0288644 A1 | 11/2008 | Gilfix et al. |
| 2009/0063353 A1* | 3/2009 | Viidu et al. .................... 705/75 |
| 2010/0088423 A1* | 4/2010 | Mazzagatte et al. .......... 709/229 |
| 2010/0153444 A1 | 6/2010 | Nayak et al. |
| 2011/0265159 A1* | 10/2011 | Ronda et al. ...................... 726/6 |
| 2011/0321148 A1* | 12/2011 | Gluck ............................... 726/9 |
| 2012/0036563 A1* | 2/2012 | Glasgow et al. ................. 726/5 |

* cited by examiner

```
    10
   /
<soapenv:Header xmlns:soapenv="http://schemas.xmlsoap.org/soap/envelope/">
12 —   <ns1:SessionType xmlns:ns1="http://siebel.com/webservices">stateless</ns1:SessionType>
14 —   <ns2:UsernameToken xmlns:ns2="http://siebel.com/webservices">SADMIN</ns2:UsernameToken>
16 —   <ns3:PasswordText xmlns:ns3="http://siebel.com/webservices">MSSQL</ns3:PasswordText>
</soapenv:Header>
```

Figure 1A

```
    20
   /
<siebel-header:SessionToken xmlns:siebelheader="http://siebel.com/webservices">
MN9Sxl9Any9zGQTOFIuJEJfCXjfl0G- 9ZOOH4IJjbSd2P.G7vySzo07sFeJxUA0WhdnK
</siebel-header:SessionToken>
</SOAP-ENV:Header>
```

Figure 1B

COMPUTER NETWORK, COMPUTER SYSTEM, COMPUTER-IMPLEMENTED METHOD, AND COMPUTER PROGRAM PRODUCT FOR MANAGING SESSION TOKENS

TECHNICAL FIELD

The description is directed generally to session management in a distributed computer network.

BACKGROUND

In the World Wide Web (WWW), service providers often offer their services through specific application programming interfaces (APIs) that are accessible via the Hypertext Transfer Protocol (HTTP). The services are executed on a remote system or server, hosting the requested service. Such APIs are referred to as web services. Orchestrated web services can be, for example, implemented in a loosely coupled architecture according to service-oriented architecture (SOA) principals. In a SOA-based implementation of orchestrated web services the basic unit of communication is a message, rather than an operation.

According to the SOA principals, web services comprise loosely coupled units of functionality that have no calls to each other embedded in them. Each service implements one action, such as filling out an online application for an account, or viewing an online bank statement, or placing an online booking or airline ticket order. The web services use defined protocols that describe how services pass and parse messages using description metadata. For example, the Web Services Description Language (WSDL) can be used to describe the web services themselves, while the Simple Object Access Protocol (SOAP) can describe communications protocols between web services.

Accessing a web service from an entity (e.g. a client application operated by a user) typically requires being compliant with security requirements. For example, before executing some requested functionality of a web service, a web server hosting the web service (aka web service provider) may need to check if the user is allowed to invoke the web service and/or the requested functionality. In other words, web services providers may authorize or not access to a web service and/or requested functionality. Granting a user access to a web service and/or related functionality is typically related to establishing a session between the client application operated by the user and the web service provider. During the session, the client application and the web service provider may exchange one or more messages in the same session without the need to grant access again as long as the session is active.

A session may relate to a semi-permanent interactive information interchange between two or more entities (including e.g. a server computer, a client computer hosting a client application, a communication device, etc.). A session may be set up or established at a certain point in time, and torn down at a later point in time. An established session may involve more than one message between the involved entities in each direction. When security requirements impose a web service interaction to set-up a session to enable client and server to exchange messages, client application has to implement all the logic and functionalities to manage set-up, renewal, expiration of a session. When a session is or has been established, it usually associated with a token (also referred to as a session token). Tokens or session tokens are the unique identifiers of the session and must be passed in the body of the messages as a form of "certificates" to exchange messages with the server inside the same session. In most web service implementations, session management is however often performed in a less optimized and rather inefficient manner. For example, by opening a new session for each message exchanged by each client invoking the web services. Indeed session management of the web server usually generates a new session token for a user each new session. Session management might be therefore inefficient with regard to processing resources such as time, memory, and/or performance, in particular, when a user is invoking and/or running a plurality of different sessions.

Consequently, there is a need to provide an efficient mechanism for managing user's session tokens for client applications interactions that can improve performance regarding time and/or memory consumptions

SUMMARY

According to one general aspect, a computer network for managing session tokens is provided. The network may comprise a client operable to run a client application; a web server hosting at least one web service; and a session token manager operable to receive a check out message along with user credentials from the client application, wherein the user credentials identify a user operating the client application; process the check out message to determine a session token from a pool of session tokens managed for the user; and send a token identifier (token ID) to the client application pointing to the determined session token, wherein the session token can be used by the client application to point to and/or to re-use a previously established session with the web service without re-establishing a new session.

According to another general aspect, a computer-implemented method for managing session tokens is provided. The method may comprise: receiving a check out message along with user credentials (e.g. a username and/or a password of the user) from a client application, wherein the user credentials identify a user operating the client application; processing the check out message to determine a session token from a pool of session tokens managed for the user; and sending a token identifier (token ID) to the client application pointing to the determined session token, wherein the session token can be used by the client application to point to and/or to re-use a previously established session with the web service without re-establishing a new session.

In one implementation of the session token manager using an object-oriented programming language such as C++ or Java, etc., the check out message may be implemented by a check out method.

The pool of session tokens managed for a user at a session manager may be implemented by a table and/or a list (e.g. in the form of a hash table) comprising a possibly empty list of sessions tokens which have been or which are currently in use by the user. For example, the list of sessions may be empty when initializing the pool of session tokens and/or when a user starts up a first session with a web service. If the list of session tokens for the user (i.e. the pool of session tokens) is empty (i.e. no session token exists for the user), then no token ID and/or an empty token ID may be returned. In this case, there has been no already initialized session (and hence no session token) for the user available. Therefore, the client application operated by the user may need to call the web service along with the user credentials for initializing a new session and hence for generating a corresponding session token for the user.

If the list of session tokens for the user (i.e. the pool of session tokens managed for the user) is not empty and hence comprises at least one session token, then for the user there may be two lists available. Similar to the pool of session tokens, said two lists may also be implemented in terms of hash tables and/or hash structures. One of the two lists may comprise available and therefore unlocked session tokens of the user and the other of the two lists may comprise session tokens currently in use in a session of the user and therefore locked session tokens.

The method for managing session tokens may be implemented by a session token manger which is operable to manage a pool of session tokens for a user. A pool of session tokens may relate to a gathering and/or managing entity for session tokens. The session token manager and hence the method executed by the session token manager provides a management of session tokens generated for and associated with a specific user having generated the session token. For example, using an available session management mechanism, each of the session tokens comprises an encrypted string including the session ID, user credentials such as a username and a password, and/or a timestamp extracted from the request of the user to initiate a session with the web service. A session token is unique with regard to a user to preserve integrity context. For example, data access with a session token can be used by the user for whom the session token is generated. The method for managing session tokens may enable to manage a plurality of session tokens for a user operating and/or initiating different sessions.

In this way, session management may become more efficient and more flexible. Session management using session tokens according to the method may be more efficient with regard to processing time and/or required memory resources since resources and/or time required to establish a session may only be consumed once at the beginning of interactions of a user with a web service, when a (web) client application and web server provider exchange a first message in a first session.

The client application may use the returned session token to invoke the requested web service again without set-up a new session. The token ID corresponding to the session token uniquely represents a session already established by the client application with the web service. The session token establishes a pointer to the determined session. Hence, the invocation may take place without the requirement of any further specification of a username and/or a password so that the web service can be invoked without any session initialization of the corresponding session. In this way, significant processing time can be saved.

According to another aspect, processing the check out message to determine a session token from a pool of session tokens managed for the user may comprise: determining whether there exists at least one session token in a hash structure comprising unlocked session tokens (session tokens which are currently not in use in another session of the user and therefore available for the user who wants to invoke the new session).

According to yet another aspect, session tokens currently in use in a session of the user may be stored in a hash structure comprising locked session tokens.

According to yet another aspect, each of the hash structures may comprise a list of one or more pairs in the form <key, value>, wherein the key represents a token ID (e.g. a string) of a session token and the value the associated session token.

The check out method may be provided by a session pool component of the session token manager. The check out method of the session pool component may operate on a hash structure which implements a collection of pairs <key, value>, wherein the key is represented by a username (of the user taken from the user credentials)) and the value is represented by an object instantiated from a user session pool component. The user session pool component may be also provided by the session token manager. In other words, a session token is associated with a corresponding username of a user having generated the session token. Then, to determine a session token for the user from the pool of session tokens, the check out method of the session pool component may determine a session token by calling a check out method provided by the user session pool component. For example, the check out method may call the check out method of the user session pool component with the object instantiated from a user session pool component from a pair of its hash structure. In other words, the hash structure used by the check out method called by the client application provides a data structure which can be used to handle session tokens as generated in a session management system, wherein a session token is generated with regard to a specific user who has requested the session token for a session. The check out method of the user session pool component may operate on the hash structures representing locked and unlocked session tokens, respectively for the user.

The hash structure comprising unlocked session tokens and the hash structure comprising locked session tokens may be implemented as lists of pairs <key, value>, wherein in such a pair the key may specify a token string and the value may specify a corresponding session token. The token string in a pair of a hash structure may represent a token ID corresponding to a session token specified in the value of the pair.

The hash structures may increase the reuse of code and eases user-based management of session tokens. This may represent a great benefit for the design process and enables to adapt this solution to new kinds of problems that have similar features.

According to yet another aspect, the session token may be a valid session token if the session token is not expired.

The check out method of the user session pool component may search the unlocked hash structure. The unlocked hash structure may comprise possible, available and thus usable session tokens for the user. In case a session token taken from the unlocked hash structure is not expired (and therefore valid); the session token fulfills the following first requirement: An expiration time of the considered session token from the unlocked hash structure should not be expired. That means, an expiration time of the session token should be less then a specified expiration time for the session token.

According to yet another aspect, the valid session token may have been used less than or equal to a pre-defined maximum usage value.

A session token may be considered as a valid session token only in case the session token additionally to the first requirement may also fulfill a second requirement: The session token being considered has been used a number of times less or equal than the value of a specified maximum usage.

According to yet another aspect, if the session token is not a valid session token, the token ID (in particular the pair (token ID, session token), i.e. the pair comprising the token ID and the corresponding session token) may be empty.

According to yet another aspect, the session token corresponding to the empty token ID may be removed from the pool of session tokens.

According to yet another general aspect, a computer system for managing session tokens is provided. The system may comprise a session token manager operable to: receive a check out message along with user credentials from a client application, wherein the user credentials identify a user operating the client application; process the check out message to determine a session token from a pool of session tokens managed for the user; and send a token identifier (token ID) to the client application pointing to the determined session token, wherein the session token can be used by the client application to point to and/or to re-use a previously established session with the web service (300) without re-establishing a new session.

According to yet another aspect, the computer network and the computer system may be further operable to perform any of the methods as described.

In yet another general aspect there is provided a computer-program product comprising computer readable instructions, which when loaded and run in a computer system and/or computer network system, cause the computer system and/or the computer network system to perform a method as described.

The subject matter described in this specification can be implemented as a method or as a system or using computer program products, tangibly embodied in information carriers, such as a CD-ROM, a DVD-ROM, a semiconductor memory, signal and/or data stream, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various MRI machines.

Details of one or more implementations are set forth in the accompanying exemplary drawings and exemplary description below. Other features will be apparent from the description and drawings, and from the claims.

BRIEF DESCRIPTION OF THE DRAWINGS

FIG. 1A shows an exemplary request SOAP header comprising a username and a password for authentication against a web server hosting a requested web service.

FIG. 1B shows an exemplary session token generated from the SOAP header shown in FIG. 1A.

TECHNICAL TERMS

Figure 2:
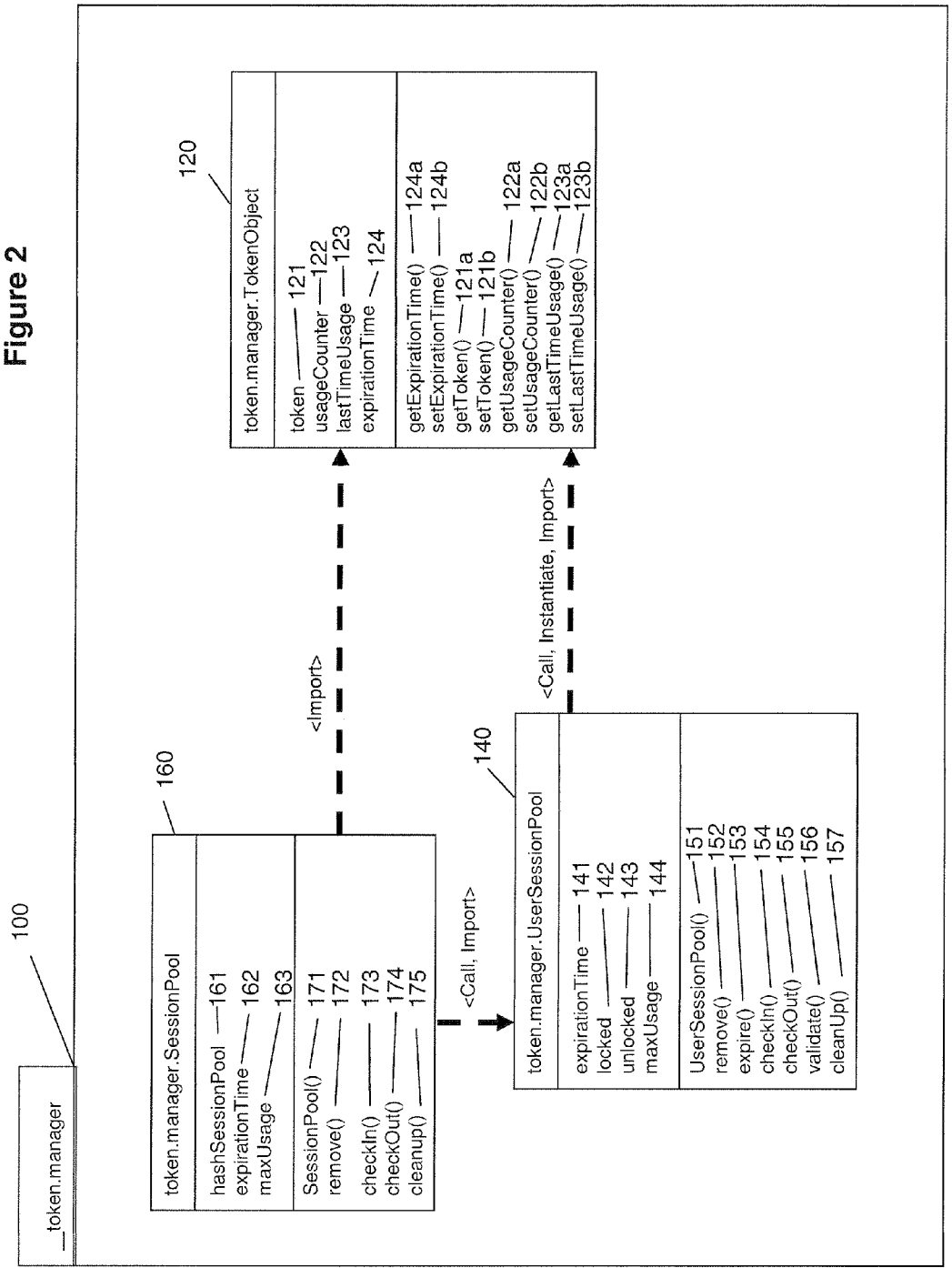
FIG. 2 shows an exemplary Java-based implementation of a session token manager for session token management.

Following technical terms are widely used throughout the description. The terms may refer to but are not limited to the subsequently given explanations.
Web Service In general, a web service may relate to an application programming interface (API) that can be accessed for example via the hypertext transfer protocol (HTTP) and executed on a remote system (e.g. a web server) which is operable to host the requested web service. More specifically, according to a definition of web services given by the W3C (the World Wide Web Consortium), a web service may relate to "a software system designed to support interoperable machine-machine interaction over a network. It has an interface described in a machine-processable format (e.g. the Web Services Description Language, WSDL). Other systems interact with the web service in a manner prescribed by its description using Simple Object Access Protocol (SOAP) messages, typically conveyed using Hypertext Transfer Protocol (HTTP) with an eXtensible Markup Language (XML) serialization in conjunction with other Web-related standards". The W3C also states, "We can identify two major classes of Web services, REST-compliant Web services, in which the primary purpose of the service is to manipulate XML representations of Web resources using a uniform set of 'stateless' operations; and arbitrary Web services, in which the service may expose an arbitrary set of operations." Web services may also be used to implement architecture according to Service-Oriented Architecture (SOA) principals wherein the basic unit of communication is a message rather than an operation. Web services orchestrated in a SOA are often referred to as "message-oriented" services.

SOAP is specified in a W3C recommendation and may basically relate to a protocol specifying exchanging structured information in the implementation of web services in computer networks. SOAP relies on XML and for its message format; it may rely on other application layer protocols, such as Remote Procedure Call (RPC) and/or HTTP, for message negotiation and transmission. SOAP can form the foundation layer of a web services protocol stack, providing a basic messaging framework upon which web services can be built. This XML based protocol may comprise three parts: an envelope, which defines what is in the message and how to process it, a set of encoding rules for expressing instances of application-defined data types, and a convention for representing procedure calls and responses.

A SOAP message may comprise two SOAP-specific sub-elements within the overall env:Envelope element, namely an env:Header element (i.e. a SOAP header) and an env:Body element (i.e. the SOAP Body). The contents of these elements are defined depending on a specific application. A SOAP header may relate to an extension mechanism that provides a way to pass information in SOAP messages that is not application payload. Said control information includes, for example, passing directives or contextual information related to the processing of the message. This allows a SOAP message to be extended in an application-specific manner. The immediate child elements of the env:Header element are called header blocks, and represent a logical grouping of data which can individually be targeted at SOAP nodes that might be encountered in the path of a message from a sender to an ultimate receiver. SOAP headers may be inspected, inserted, deleted or forwarded by SOAP nodes encountered along a SOAP message path. The SOAP body is the mandatory element within the SOAP env:Envelope element, which implies that this is where the main end-to-end information conveyed in a SOAP message must be carried out.
Session In computer networks, a session may relate to a semi-permanent interactive information interchange between two or more entities such as communicating devices, a computer, and/or a user who operates through a client application hosted on a client computer, etc. A session may be set up or established at a certain point in time, and torn (or shut) down at a later point in time. A session may establish a connection between two parties (e.g. a client application and a web service) and may allow said two parties to exchange messages among them. An established communication session may involve more than one message in each direction. A session may be stateful or stateless. In a stateful session at least one of the communicating parts needs to save information about the session history in order to be able to communicate and/or to exchange multiple independent messages within the established session. In a stateless session communication between entities may consist of independent sessions established for each request—response pair between the two parties. In a stateless session the two parties involved in the session may need to set-up a new session every time a new message is exchanged.

Session Token

A session token (also referred to as a token) may relate to a unique identifier that is generated and sent from a (web) server or server computer hosting at least one web service to a client application operated on a client (computer) to identify the current interaction session. The current interaction session may be established between the client application and the web service. The client application may store and send the session token as an HTTP cookie and/or sends the session token as a parameter in GET or POST requests to the server. A reason to use session tokens may be that the client application may only need to handle an identifier of the session token, wherein other or further session data may be stored on the server linked to said identifier. The further session data associated and/or linked to the session token may be stored in a database to which the client application may not have direct access.

Session Management

Basically, session management may relate to a process of keeping track of a user's activity across sessions of interaction with a computer system. In one example, the user's activities may be performed through a client application hosted on a client computer and the computer system may be a web service hosted on a web server. Session management tasks may include keeping track of which applications and/or web services are open and which documents each application has opened, so that the same state can be restored when the user logs out and logs in later. For a website and/or for a web service, session management may involve requiring the user to re-login if the session has expired (e.g., a certain time limit has passed without user activity).

In the context of web servers, session management may be operated using HTTP. In general, HTTP is stateless. Therefore, a client computer running a web browser may need to establish a new Transmission Control Protocol (TCP) network connection to the web server with each new HTTP GET or POST request. The web server, therefore, cannot rely on an established TCP network connection for longer than a single HTTP GET or POST operation.

Session management may relate to a technique used by web developers to allow the stateless HTTP protocol to support a session state. For example, once a user has authenticated himself to a web server, the next HTTP request (GET or POST) of the user should not cause the web server to ask the user for his username and password again. Such session information may be stored on the web server using a session identifier (session ID) generated as a result of the first request from the user. The first request may be the first authenticated request. Storing of session IDs and the associated session data (username, account number, etc.) on the web server may be accomplished using a variety of techniques including, but not limited to: local memory, flat files, and/or databases.

If session information is considered transient, volatile data that may not be required for non-repudiation of transactions and may not comprise data that is subject to compliance auditing then any method of storing session information can be used.

However, if session information may be subject to audit compliance, consideration should be given to the method used for session storage, replication, and/or clustering. In a SOA, SOAP messages constructed with XML messages may be used by client applications to cause web servers to create sessions.

DETAILED DESCRIPTION

In the following, a detailed description of examples will be given with reference to the figures. It should be understood that various modifications to the examples may be made. In particular, elements of one example may be combined and used in other examples to form new examples.

To organize and manage (user) sessions for web services hosted on one or more web servers, a mechanism referred to as session management can be implemented. Session management for web services is usually connected to authentication when a user requests and/or accesses a web service. In one exemplary implementation, a user authentication against a web service may be realized by an appropriate specification within a SOAP header.

In general, an authentication mechanism to authenticate a user against a web service and session management may be used in combination to send and/or receive user credentials and session information. User credentials may comprise different mechanisms for identification against a web server hosting a web service such as a username and a password. User credentials for log-in at a web service that calls either a stateful session or a stateless session may be sent. A session that closes after a (outbound) response is sent may be referred to as a stateful session. A session that remains open after a (outbound) response is sent may be referred to as a stateless session.

An example of generating a session token based on a SOAP message sent by a client application operated by a user to request a web service is shown with reference to FIGS. 1A and 1B.

For example, a client application (operated by a user) may send a request (e.g. in a header 10 of a message) together with a username (e.g. in a username token 14) and a password (e.g. in a password token 16) to a web service and may call a stateless session (e.g. using the SOAP message type stateless 12). A web server hosting the web service then may generate an encrypted session token (e.g. the session token 20) that comprises the user credentials (i.e. the username and the password of the user using the client application). The web server may include the session token in the SOAP header of the response. The client application is responsible for capturing the session token which is returned in the response from the web server. Furthermore, the client application includes the session token in the SOAP header of a subsequent request against said web service.

A manager component for session management connected to the web service extracts the user credentials and the ID (or token ID) of the session token and reconnects to the session on the web service. If the initial or original session corresponding to the session token has been closed or expired the session manager informs the web service to respond to the client request with error messages informing that the session associated with the session token is expired. Then the client application is forced to send a new message with user credentials of the user to set-up a new session for the user.

In one exemplary implementation as shown in FIG. 1A, SOAP headers may be used to call different types of sessions and to pass authentication credentials within session management of web services. The 'Session Type' SOAP header can be used to define the type of a session. Using SOAP; valid values for a session may comprise none, stateless, or stateful.

An exemplary SOAP header 10 of a SOAP message defining the session type 12 of a stateless session and comprising the username 14 and the password 16 of a user operating a client application to authenticated against a web server hosting a web service can be used to invoke a web service.

According to the session type none (which is usable in the 'Session Type' SOAP header), a new session is opened for each request from a user operating a client application and then closed after a response is sent out. The session type 'none' may or may not include SOAP headers for a username and a password of the user which can be specified in the SOAP headers 'UsernameToken' and 'PasswordText'. When the SOAP header comprises a username and a password header, said credentials are used for user authentication. If the username and password headers are not used in the SOAP header, anonymous login may be assumed.

According to the session type stateless (which is usable in the 'Session Type' SOAP header), a new session is opened for an initial request against a web service and the session remains open for subsequent requests. A re-login of the user at the web service occurs automatically if the session is closed. The re-login may be transparent to the user. Username and password SOAP headers are included in the initial request against the web service to open a stateless session. Using the stateless type for session management, the client application operated by the user provides the username and the password of the user only once for the initial request. A session is opened on the web server hosting the requested web service and is dedicated for this user. In response to the request, the web service returns a session token to the client application. The session token may comprise an encrypted string including the information about username, password, and/or timestamp. Said information may be extracted from the request SOAP header. Furthermore, the session token may comprise a session identifier (session ID). The session ID may be used to reconnect to an existing session or automatically log in again if the session has been terminated. For subsequent requests, the client application uses the session token to reuse the session initiated with the initial request. In order to increase security, session tokens may be regenerated for each response. In this way, the client application needs to provide the last received session token for the next request.

According to the session type stateful (which is usable in the 'Session Type' SOAP header), a new, dedicated session is opened for an initial request of a user from a client application for a web service hosted at a web server and the session remains open for subsequent requests. A re-login for the user does not occur automatically if the session is closed. The username and password headers are included in the initial request to open a stateful session. The web service returns a session token corresponding to the request in the response to the client application. The session token may comprise an encrypted string including the information about username, password, and/or timestamp. Said information may be extracted from the request SOAP header. Furthermore, the session token may comprise a session identifier (session ID). For subsequent requests, the client application uses the session token to reuse the session. Unlike stateless sessions, transparent failover (i.e. automatic re-login) is not foreseen within stateful sessions. Rather stateful sessions may store state information that makes it mandatory to connect to the same web service for each request.

According to the exemplary implementation of the session type SOAP header shown in FIG. 1A, a session token 20 as shown in FIG. 1B is generated. The session token 20 comprises an encrypted string including the information about the username 12 and the password 14 of the user having sent the request to the web server. Furthermore, the session token 20 comprises in the encrypted string a timestamp specifying when the session token has been generated.

Session tokens generated as described above and as shown in FIGS. 1A and 1B may be generated so that every session token can be used only by the user that has generated the session token when having performed a (initial) request to a web server hosting a requested web service. This is due to the fact, that each of the generated session tokens comprises an encrypted value including a session ID, a username, a password, and/or a timestamp extracted from the request SOAP header of the request from the user to a web service. Such an encrypted value representing a session token 20 is shown in FIG. 1B.

Session tokens (e.g. session token 20) generated for session management for web services as previously described with reference to FIGS. 1A and 1B should be managed and organized in a reusable and scalable environment so as to enable efficient and fast transactions from and/or to web services. Furthermore, governance of the environment for session token management should be eased to easily detect anomalies and to achieve a better performance. An exemplary implementation of session token management of such session tokens 20 is described in the following with reference to FIGS. 2 and 3.

One implementation of a session token manager 100 which overcomes the above mentioned disadvantages and which is operable to manage session tokens which are generated for specific users is shown in FIG. 2. The session token manager 100 implements a way to manage session tokens initially generated as described with reference to FIGS. 1A and 1B so that the session tokens become (re-)usable by the user. In other words, the session token manager 100 implements components and/or methods to make a diversification of session tokens for users possible.

For this purpose, the session token manager 100 implements a mechanism to manage a pool of session tokens implemented by a token object component 120, a user session pool component 140, and a session pool component 160. The session pool component 160 is visible to a client application operated by a user for requesting a web service hosted on a web server. The session pool component 160 calls and/or imports the user session pool component 140 to perform its operations. The token object component 120 is used by the two other pools 140 and 160, respectively to perform their respective operations.

A client application may communicate with the session token manager 100 and in particular with the session pool component 160 by using specific messages exposed by the session pool component 160. The client application may use the exposed messages to request a session token identifier (token ID) for invoking a session with a web service, to return a refreshed session token to the web service during a session, and/or to remove expired session tokens from the pool of session tokens managed by the session token manager 100. The messages exposed to a client application by the session pool component 160 may comprise a check out message 174, a check in message 173, and/or a remove message 172.

In one exemplary implementation, the software components of the session token manager 100 shown in FIG. 2 can be implemented in an object-oriented programming language such as Java, C++, C#. In the exemplary Java implementation of the session token manager 100, the token object component 120 is implemented by a class TokenObject, the user session pool component 140 is implemented by a class UserSessionPool, and the session pool component 160 is implemented by a class SessionPool. Implementing the session token manager using an object-oriented programming language, the above mentioned messages 172, 173, 174 may be implemented by corresponding methods 172, 173, 174 exposed by the session pool component 160.

In the session token manager 100, session tokens may be implemented in terms of token objects being instances of the token object component 120 and having the therein specified properties and/or methods. In the following, the term session token is used for token objects as implemented in the session token manager 100.

The token object component 120 represents session tokens. The session tokens can be used by client applications when requesting a web service in a session.

The token object component 120 comprises information for specifying session tokens. The information specifying session tokens may be implemented by one or more properties 121, 122, 123, and 124. A token property 121 may be used to implement a string representing a session token. A usage counter property 122 may be used to implement a number of times a session token has been used. For example, as a default value for the usage counter property 122, '1' is defined. A last time usage property 123 is used to determine whether a session token can be further used in a session. The "last time usage" property 123 may be implemented by a Boolean, wherein the value 'false' is set as a default value for said property 123. If the value of the last time usage property 123 is 'true', then the corresponding session token is already in use and cannot be further used in a subsequent client transaction. An expiration time property 124 can be implemented to specify a period of validity for a session token. Furthermore, a session may comprise a specified time out, i.e. a time period, a session can remain inactive before a client application having initiated the session is logged out and the session is closed. Additionally, a session token for a session may comprise a time out, i.e. a time period within which the session token can be inactive before the session token's validity period is expired, i.e. if the session token's expiration time is exceeded. In one implementation, the validity period of a session time is expired and the session token is therefore rejected if the session token is inactive for more than the value set for the expiration time of the session token. Whenever the session token is used, the expiration time associated with the session is refreshed, i.e. a value of the expiration time property 124 of the session token is refreshed and hence re-set to a new value.

Furthermore, the token object component 120 comprises getter and setter methods for each of the properties 121, 122, 123, 124 to set and get the corresponding values of the one or more properties 121, 122, 123, 124 associated with a session token. If the values of the properties 121, 122, 123, 124 may be implemented as private in a corresponding Java implementation, the getter and setter methods are required. Accordingly, the token property 121 comprises associated get and set methods to get and set values for the token property 121 of a session token: getToken( ) 121a and setToken( ) 121b. The usage counter property 122 comprises associated get and set methods to get and set the usage counter property 122 of a session token: getUsageCounter( ) 122a, and setUsageCounter 122b. The last time usage property 123 has associated get and set properties to get and set last time usage property 123 of a session token: getLastTimeUsage( ) 123a and setLastTimeUsage( ) 123b. The expiration time property 124 has associated get and set properties to get and set the expiration time property 124 of a session token: getExpirationTime( ) 124a and setExpirationTime( ) 124b.

Getter and setter methods, which are also referred to as accessor methods, provide access to an object's properties (e.g. to the one or more properties 121, 122, 123, 124 of a session token). A get method returns the value of a property held by an object (e.g. a session token which is an instance of the token object component 120). A get method has a return type matching the type of the associated member variable. Get methods typically do not take any parameters. A set method has a "void" return type and takes a parameter of the appropriate type to assign to the associated member variable. Getter and setter methods are usually written only for values that need to be accessed externally.

The user session pool component 140 is operable to implement processes required to manage a pool of session tokens. The pool of session tokens managed by the user session pool component 140 are instances of the token object component 120 and therefore session tokens generated by the token object component 120 and then managed in the user session pool component 140.

The user session pool component 140 comprises one or more properties 141, 142, 143, and 144. An expiration time property 141 represents a period of validity of a session token. The expiration time property 141 may correspond to the expiration time property 121 of the object token component 120. The lock property 142 and the unlocked property 143 are implemented by corresponding hash structures. The locked and unlocked properties 142 and 143 may also be referred to as hash structures comprising locked and unlocked session tokens, respectively. The lock and unlock properties 142 and 143 allow to administrate and separate session tokens that are currently in use from session tokens that are available for session management of a user session with a web service. The lock and unlock properties 142 and 143 may be implemented as instances of the java.util.Hashtable class in a Java implementation of the session token manager 100. Using said Java implementation, the lock and unlock properties 142 and 143 may be implemented as collections of pairs <key, value>, wherein in such a pair the key may specify a token string and the value may specify a corresponding instance of the token object component 120, i.e. a session token. For example, the token string in a pair of a hash structure may represent a token ID corresponding to a session token specified in the value of the pair. In another example, a token ID may relate to a pointer pointing to a session token as organized and/or managed by the session token manager 100. The maximum usage property 144 specifies a maximum number of times a session token can be used.

Interactions of the user session pool component 140 is implemented by one or more methods 151, 152, 153, 154, 155, 156, and 157 operating on one or more of the properties 141, 142, 143, and 144 of said component 140. The methods 151, 152, 153, 154, 155, 156, and 157 of the user session pool component 140 comprise logics necessary for managing session tokens in the session token manager 100.

A constructor 151 of the class, i.e. the user session pool component 140 may be implemented by a UserSessionPool( ) method. The constructor 151 receives as input parameter two values that are used to set the expiration time property 141 and the maximum usage property 142 for a session token in the session token pool. After having set said two properties 141 and 142, hash structures for the lock and unlock properties 143 and 144 of the session token are initialized.

A remove method 152 is implemented with the functionality to remove from a locked property 142 (i.e. from the corresponding hash structure or hash table implementing the locked property of session token) a session token that the remove method 152 receives as input parameter.

An expire method 153 determines during the process when a user checks out from a session whether there exist one or more session tokens that are expired (in time). Each session token which is expired is then removed from the unlocked property 143, i.e. the hash structure representing and storing unlocked session tokens.

A check in method 154 specifies and/or implements operations that allow releasing a used session token. A used session token may be released if the session token is no longer used in a session. The input parameter of the check in method 154 is a session token that has to be released and a string representing the session token according to the token property 121 of the token object component 120.

For example, if there exists an input session token, i.e. if the input session token is not null and/or empty, then the session token is removed from the locked hash structure represented by the locked property 142 and inserted in the unlocked hash structure represented by the unlocked property 143 through the check in method 154. Furthermore, the check in method 154 sets the expiration time property 141 to the current time the session token is checked in. Additionally, the string represented in the token property 121 of the token object component 120 is set to the token string of the session token being the input parameter to the check in method 154.

In other words, according to the check in method 154, the released session token is moved from the hash structure representing locked session tokens (e.g. session tokens currently used in a session) to the hash structure representing unlocked session tokens (e.g. session tokens currently not in use for a session). A session token is released if a session token which was previously in use in a session is no longer in use for the session.

A corresponding token string being represented in the token property 121 is set to the token string input parameter of the session token. The session token is inserted into the unlocked hash structure represented in the unlocked property 143.

A check out method 155 specifies and/or implements a process to retrieve a session token which can be used in a session by a user. For this purpose, the check out method 155 searches the unlocked hash structure implemented in the unlocked property 143. The unlocked hash structure comprises possible, available session tokens for the user.

To be valid (i.e. not expired), a session token in the unlocked hash structure satisfies at least one of the following two requirements: Firstly, an expiration time property 141 of a considered session token from the unlocked hash structure should not be expired (referred to as the first requirement). Secondly, the session token being considered has been used a number of times less or equal than the value of the maximum usage property 144 associated with the considered session token (referred to as the second requirement).

Each of the session tokens in the unlocked hash structure specified in the unlocked property 143 is inspected with regard to the two requirements.

In one exemplary implementation, if a session token does not satisfy both of the requirements, the session token is considered to be expired (not valid). The expired or non-valid session token is removed from the unlocked hash structure represented in the unlocked property 143. Otherwise, if a session token from the unlocked hash structure satisfies the requirements, the respective session token is removed from the unlocked hash structure represented by the unlocked property 143 and inserted into the locked hash structure represented by the locked property 142. Said session token is then returned as an output parameter by the check out method 155. If the unlocked property 143 is empty, i.e. does not comprise any session token in its hash structure, then the check out method 155 returns a session token that comprises as a token property 121 the string "NullToken" which represents an empty session token (and hence a corresponding empty token ID).

In another implementation, only one of the two requirements (e.g. the first one) needs to be satisfied by a session token to be considered as a valid (or non-expired) session token.

More particular, to implement the check out method 155, a validate method 156 is called during execution of the check out method 155. The validate method 156 verifies whether the considered session token is still valid (or not expired). In particular, the validate method 155 examines whether the second requirement is fulfilled by a considered session token. To validate the session token, the usage counter property 122 of the session token is increased by one. Then, the validate method 156 examines the new value of the usage counter property 122. If the new value of the usage counter property 122 exceeds the maximum usage property 144, then the validate method returns false, i.e. the considered session token is not valid. The not valid session token is removed from the unlocked hash structure represented in the unlocked property 143. If the value of the usage counter property 122 for the session token is less than the maximum usage property 144, the validate method 156 returns true. If the value of the usage counter property 122 for the session token is however equal to the maximum usage property 144, then the last time usage property 123 for the session token is set to true and the validate method 156 returns true.

A clean up method 157 executes a process of cleaning up the locked and unlocked properties 142 and 143 associated with session tokens. The clean up method 157 removes expired session tokens comprised either in the locked property 142 or in the unlocked property 143 from the corresponding hash structure (i.e. from the locked hash structure or from the unlocked hash structure, respectively). The clean up method 157 may be called from an external environment at regular time intervals in order to keep session tokens coherent.

The session pool component 160 is operable to implemented processes required to manage sessions of a user through a plurality of session tokens. The session pool component 160 provides an interface to a client application operated by a user who wants to request a web service and provides the user with a session token for the requested session. The session pool component 160 may be implemented by calling and or importing the properties and/or methods of the user session pool component 140 and/or those of the token object component 120.

The session pool component 160 comprises one or more properties 161, 162, and 163. The properties 161, 162, and 163 correspond to the properties 141, 142, 143, and 144 of the user session pool component 140, however, with some differences in their implementation. In particular, the session pool component 160 comprises a hash session pool property 161, which basically replaces the hash structures of the locked and unlocked properties 142 and 143 of the user session pool 140 by a single hash structure in the hash session pool property 161. The hash structure implementing the hash session pool property 161 implements a collection of pairs <key, value>, wherein the key is represented by a username and the value is represented by an object instantiated from the session pool component 160. The username may be comprised in the user credentials a user has provided when initializing a session with a web service. In other words, by implementing the hash session pool property 161, the session pool component 160 enables and/or allows to handle session tokens according to the identity of a user that has performed the authentication (e.g. by providing his user credentials). Furthermore, by calling the user session pool component 140, use of program code can be increased and/or session token management can be performed easier and therefore less complex and/or difficult. Therefore, the implementation of the session pool component 160 and in particular its hash session pool property 161 may provide a great benefit for a design and/or implementation process of session token management and may also enable to adapt said approach to new kinds of problems that comprise similar aspects.

By providing the hash session pool property 161, the session pool component 160 allows for handling and/or managing session tokens according to the identity of a user that has performed an initial request against a web service to open and/or initiate a session and has authenticated himself against the web server hosting the requested web service. For the session initiated by the user a corresponding session token is generated which is then handled in the hash session pool property 161 as described.

In other words, the hash session pool property 161 provides a data structure which can be used to handle session tokens as generated in a session management system, wherein a session token is generated with regard to a specific user who as requested the session token for a session. Furthermore, since the session pool component 160 interacts with the user session pool component 140 and/or the token object component 120, session tokens generated for the user can be managed in a more efficient manner. For example, use of the user session component 160 may increase the reuse of code and eases user-based management of session tokens.

An expiration time property 162 corresponds to the expiration time property 141 of the user session pool component 140 and a maximum usage property 163 corresponds to the maximum usage property 144 of the user session pool component 140.

Interactions and operations of the session pool component 160 are implemented by one or more methods 171, 172, 173, 174, and 175.

A class constructor 171 of the session pool component 160 which may be referred to as SessionPool( ) receives two input parameters to initialize the class properties expiration time of the corresponding expiration time property 162 and a maximum usage of the corresponding maximum usage property 163 of a session token.

A remove method 172 basically allows for removing a session token from the locked hash structure implemented in the locked property 142. In particular, the remove method 172 retrieves from the hash structure implemented in the hash session pool property 171 an object of the user session pool component 160 which is associated with a specific user. Subsequently, the remove method 172 calls on the retrieved object the remove method 152 of the user session pool component 140.

A check in method 173, which may be implemented similar to the check in method 154 of the user session pool component 140, implements a process of checking in a session token. In one implementation, the check in method 173 retrieves an object of the user session pool component 160 associated with a specific user from the hash session pool property 161. With the retrieved parameters, the check in method 173 calls the check in method 154 of the user session pool component 140. As described in detail above, the check in method 154 checks in a session token into the unlocked hash structure implemented in the unlocked property 143 provided for handling session tokens of the user which are currently in use.

A check out method 174 executes a process of checking out a session token. However, unlike the check out method 155 of the user session component 140, the check out method 174 takes into account the session token generated by a specific user. In this way, the check out method 174 provides an interface of session tokens associated with the user having initially generated the session token session token management in the locked and unlocked hash structures of the user session pool component 140. This enables a more efficient implementation of session token management.

In one implementation, the check out method 174 retrieves an object of the user session pool component 140 which is associated with the input username of a user to the initiated session of the corresponding session token generated by the user. The hash session pool property 161 can be implemented by a collection of pairs <key, value> wherein the key is represented by a specific username and the value is an instance of the user session pool component 140. The hash session pool property 161 is used to handle the session tokens generated by the user that has the input username. In other words, by providing the hash session pool property 161, the session token manager 100 provides a mechanism to manage session tokens generated for a specific user by a web service invoked by the specific user. Availability of the session tokens of the users stored and/or managed in the hash session pool property 161 are then organized by the hash structures 142 and 143 comprising locked and unlocked session tokens, respectively of the user.

If there does not exists a session token associated with the input username in the hash structure of the hash session pool 161, then a new instance or object of the user session pool component 140 is created and inserted into said hash structure.

The check out method 155 of the user session pool component 140 is called with the input parameter of the hash structure according to the hash session pool property 161 (i.e. an object instantiated from the user session pool component 140) by the check out method 174 of the session pool component 160. The check out method 174 returns as an output parameter an object instantiated from the token object component 120, i.e. a session token for the associated username of a user.

The clean up method 175 is implemented by substantially the same operations executed by the clean up method 157 exposed by the user session pool component 140. The clean up method 175 is called on every object of the user session pool component 140 stored for every single user.

Figure 3:
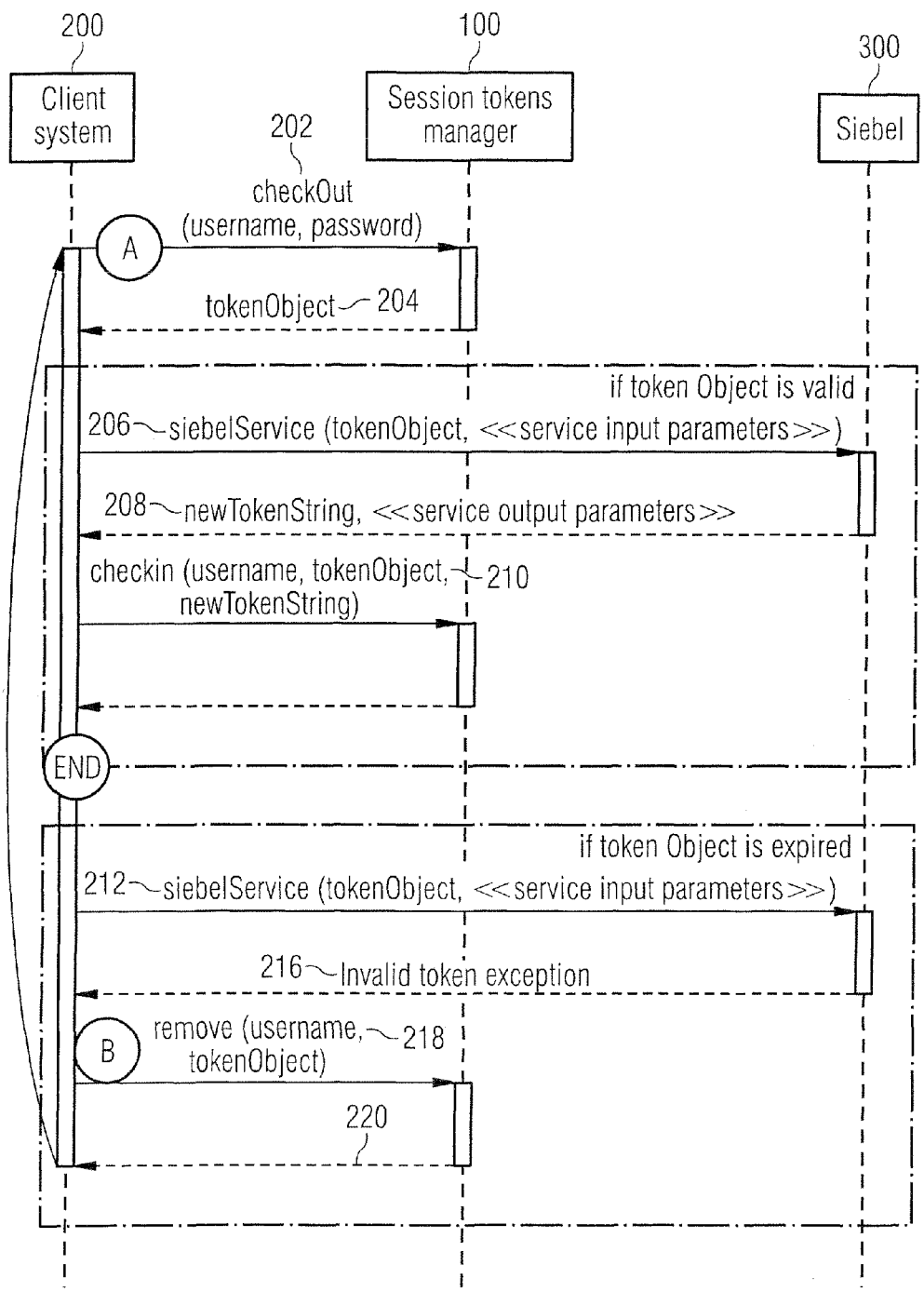
FIG. 3 shows an exemplary flow diagram of session token management for session management using a session token manager as described in FIG. 2.

FIG. 3 shows an exemplary flow diagram of session token generation and session token management using a session token manager 100 as described with reference to FIG. 2. A user operates a client application 200. The user may request or access a web service 300 hosted on a web server through his client application 200. Interaction of the client application 200 with a web service initiates a session. For the session, a session token may be determined for the user to manage the session. The session token may be determined from the pool of session tokens for the user managed by the session token manager 100. The pool of session tokens may be implemented through one or more of the components 120, 140, 160 of the session token manager 100 and may provide the properties and/or methods (also referred to as messages) as described with reference to FIG. 2. The web service 300 may be a Siebel web service 300.

It should be understood that a username and/or a password (also referred to as user credentials) is associated with the user operating the client application 200, wherein any communication between the user and the web service 300 is performed through the client application 200 since a user needs a computer to interact with a web service 300. It should be further understood that the session token manager 100 may be implemented and may comprise the components 120, 140, and 160 with the corresponding properties and/or methods as described with reference to FIG. 2.

Operations that may be performed by the client application 200 with and/or on session tokens in communication with the session token manager 100 may comprise a check in message (or method) 173, a check out message (or method) 174 and/or a remove message (or method) 172 as exposed by the session pool component 160 of the session token manager 100 as described above with reference to FIG. 2.

A client application 200 initiates a session (and/or interacts with the web service 300 during a session) for which a session token is required. At 202, the client 200 invokes the session token manager 100. In particular, the client application 200 sends a check out method 174 of the session pool component 160 (as a particular check out message 174) by passing a corresponding username and optionally also a password (e.g. user credentials) of the user operating the client application 200 to the session token manager 200. When receiving the username (and the password) in the check out method 174 at the session token manager 100 (as a particular check out message 174), it is checked by calling methods and/or properties of the user session pool component 140 whether there exist a valid (or non-expired) session token in the unlocked hash structure of the unlocked property 143. Session tokens available in the unlocked hash structure are session tokens which are available and therefore unlocked, and hence not in current use in a session of the user operating the client application 200. The check out method 174 of the session pool component 160 operates on the hash session pool component 161 as described with reference to FIG. 2. In case the hash session pool component 161 is empty for the received username, a new session token is generated for the user based on his credentials and stored in the hash session pool component 161. In case the hash session pool component 161 is empty for the received username, the corresponding check out method 155 of the user session pool component 140 which operates on the locked and unlocked hash structures (i.e. properties 142 and 143) is called to determine a session token for the user for use in the requested session.

In particular, in case there is a session token in the unlocked hash structure of the unlocked property 143, a token ID for the session token is sent to the calling client application 200 from the session token manager 100, 204. Furthermore, said session token is removed from the unlocked hash structure of the unlocked property 143 and moved to the locked hash structure of the locked property 142 since the session token is now in use by the client application 200. The session token taken from the unlocked hash structure is then examined with regard to whether the session token is not expired and thus considered to be valid. The session token is considered to be a valid (or non-expired) session token if the session token satisfies the first requirement and/or the second requirement described above with reference to FIG. 2. For example, the session token is valid if a value of an expiration time property 124 for the session token is less than a value of an expiration time property 141 for the session token in the user session pool component 140 (first requirement). Furthermore, a session token may additionally need to satisfy the following requirement in order to be valid: A value of the usage counter property 122 of the session token is less than a value of the maximal usage property 144 for the session token in the user session pool component 140 (second requirement). The second requirement for a valid session token may be implemented from a best practice experience. Said experience suggests using the same session token only for a limited number of times.

In case there is a valid session token for the request from the client application 200 in the unlocked hash structure represented in the unlocked property 143, the steps 206 to 210 are performed.

In case a (non-empty) token ID is returned by the check out method 174 to the client application 200 (as a particular check out message 174) at step 204, the client application 200 uses said returned token ID for the session token to invoke the requested web service 300, 206. Hence, the invocation may take place without the requirement of any further specification of a username and/or a password so that the web service 300 is invoked without any session initialization of the corresponding session. In this way, significant processing time can be saved. The web service 300 may be further invoked by passing additional service input parameters to the web service 300 at 206.

If the token ID received at the web service 300 is not expired, the web service 300 performs the one or more actions required to answer the request from the client application 200 and returns the answer along with a new (or refreshed) session token to the client application 200, 208.

Having received the refreshed session token from the web service 300, the client application 200 passes or sends the refreshed session token including a new token ID to the session token manager 100 and thereby calls the check in method 173 of the session pool component 160, 210 (as a particular check in message 173). In response to receiving the check in method 173 (as a particular check in message 173), the session token manager 100 substitutes the previous (originally send token ID for the session token) with the new token ID as received from the web service 300. Subsequently, the refreshed session token including the new token ID is made available for the client application 200.

In case there is no valid session token for the request from the client application 200 in the unlocked hash structure represented in the unlocked property 143, an empty token ID is returned to the client application, 204. In this case (e.g. there does not exists a valid session token for the request from the client application 200 and an empty token ID is therefore returned to the client application 200) the steps 212 to 220 are performed.

If the token ID (more specifically the pair comprising the token ID and the session token) returned at 204 and sent from the client application 200 to the web service at 212 is empty the client application 200 calls the web service 300 with user credentials to initialize a new session. The web service 300 performs the one or more actions required to answer the request from the client application 200 and the web service 300 returns the answer along with a new session token to the client application 200.

If the token ID returned at 204 and sent from the client application 200 to the web service at 212 is expired, the web service 300 returns an exception indicating an invalid session token with an invalid token ID, at 216. The client application 200 calls the remove method 172 of the session component 160 (as a particular remove message 172) to clean and/or remove the corresponding session token that is expired from the pool of session tokens as managed by the token object component 120, 218. For example, the session token corresponding to the empty token ID is removed from the hash structures, e.g. the hash session pool component 161 and/or the locked and/or unlocked properties 142 and 143 as described above with reference to FIG. 2.

After having received an indication from the session token manager 100 that the session token has been removed, 220, the client application 200 calls the check out method 174 (as a particular check out message 174) asking for a new session token and the described process may be repeated in the above described manner at step 202.

Figure 4:
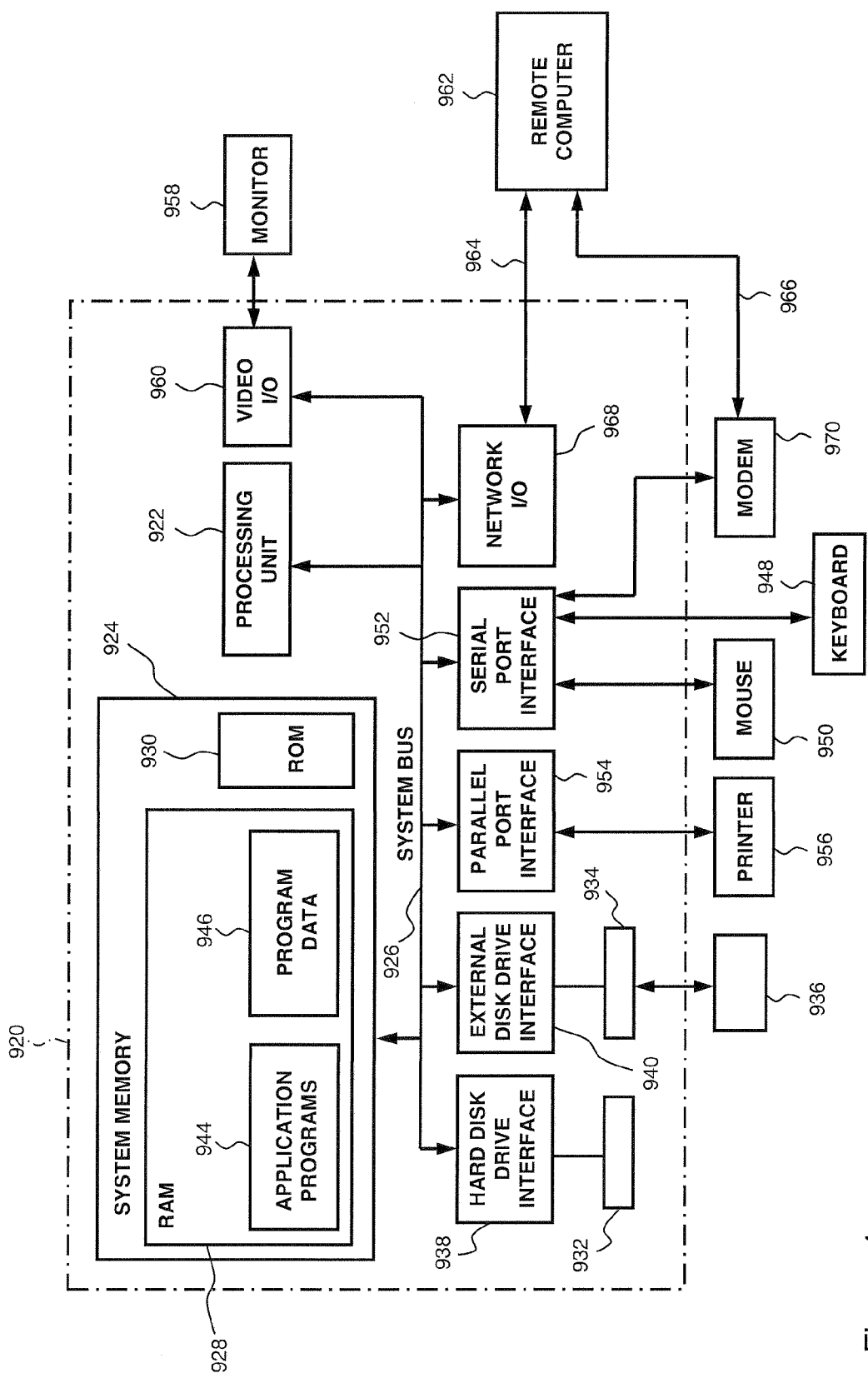
FIG. 4 relates to an exemplary computer system and/or computer network system for implementing a network, a system, and a method as shown in FIGS. 1A, 1B, 2, and 3.

FIG. 4 shows an exemplary system for implementing the invention including a general purpose computing device in the form of a conventional computing environment 920 (e.g. a personal computer). The conventional computing environment includes a processing unit 922, a system memory 924, and a system bus 926. The system bus couples various system components including the system memory 924 to the processing unit 922. The processing unit 922 may perform arithmetic, logic and/or control operations by accessing the system memory 924. The system memory 924 may store information and/or instructions for use in combination with the processing unit 922. The system memory 924 may include volatile and non-volatile memory, such as a random access memory (RAM) 928 and a read only memory (ROM) 930. A basic input/output system (BIOS) containing the basic routines that helps to transfer information between elements within the personal computer 920, such as during start-up, may be stored in the ROM 930. The system bus 926 may be any of several types of bus structures including a memory bus or memory controller, a peripheral bus, and a local bus using any of a variety of bus architectures.

The personal computer 920 may further include a hard disk drive 932 for reading from and writing to a hard disk (not shown), and an external disk drive 934 for reading from or writing to a removable disk 936. The removable disk may be a magnetic disk for a magnetic disk driver or an optical disk such as a CD ROM for an optical disk drive. The hard disk drive 932 and the external disk drive 934 are connected to the system bus 926 by a hard disk drive interface 938 and an external disk drive interface 940, respectively. The drives and their associated computer-readable media provide nonvolatile storage of computer readable instructions, data structures, program modules and other data for the personal computer 920. The data structures may include relevant data for the implementation of the method for session token management, as described above. The relevant data may be organized in a database, for example a relational database management system or an object-oriented database management system.

Although the exemplary environment described herein employs a hard disk (not shown) and an external disk 936, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 936, ROM 930 or RAM 928, including an operating system (not shown), one or more application programs 944, other program modules (not shown), and program data 946. The application programs may include at least a part of the functionality as depicted in FIGS. 1A, 1B, 2, and 3.

A user may enter commands and information, as discussed below, into the personal computer 920 through input devices such as keyboard 948 and mouse 950. Other input devices (not shown) may include a microphone (or other sensors), joystick, game pad, scanner, or the like. These and other input devices may be connected to the processing unit 922 through a serial port interface 952 that is coupled to the system bus 926, or may be collected by other interfaces, such as a parallel port interface 954, game port or a universal serial bus (USB).

Further, information may be printed using printer 956. The printer 956, and other parallel input/output devices may be connected to the processing unit 922 through parallel port interface 954. A monitor 958 or other type of display device is also connected to the system bus 926 via an interface, such as a video input/output 960. In addition to the monitor, computing environment 920 may include other peripheral output devices (not shown), such as speakers or other audible output.

The computing environment 920 may communicate with other electronic devices such as a computer, telephone (wired or wireless), personal digital assistant, television, or the like. To communicate, the computer environment 920 may operate in a networked environment using connections to one or more electronic devices. FIG. 4 depicts the computer environment networked with remote computer 962. The remote computer 962 may be another computing environment such as a server, a router, a network PC, a peer device or other common network node, and may include many or all of the elements described above relative to the computing environment 920. The logical connections depicted in FIG. 4 include a local area network (LAN) 964 and a wide area network (WAN) 966. Such networking environments are commonplace in offices, enterprise-wide computer networks, intranets and the Internet and may particularly be encrypted.

When used in a LAN networking environment, the computing environment 920 may be connected to the LAN 964 through a network I/O 968. When used in a WAN networking environment, the computing environment 920 may include a modem 970 or other means for establishing communications over the WAN 966. The modem 970, which may be internal or external to computing environment 920, is connected to the system bus 926 via the serial port interface 952. In a networked environment, program modules depicted relative to the computing environment 920, or portions thereof, may be stored in a remote memory storage device resident on or accessible to remote computer 962. Furthermore other data relevant to the method for optimization of evaluation of a policy (described above) may be resident on or accessible via the remote computer 962. It will be appreciated that the network connections shown are exemplary and other means of establishing a communications link between the electronic devices may be used.

The above-described computing system is only one example of the type of computing system that may be used to implement the method for session token management.

What is claimed is:

1. A computer network for managing session tokens, the network comprising:
    a client operable to run a client application;
    a web server hosting at least one web service; and
    a session token manager to implement a user session pool component and another session pool component to manage a pool of session tokens associated with a plurality of users operating the client application,
    wherein the user session pool component implements a hash structure of unlocked session tokens from the pool of session tokens and a hash structure of locked session tokens from the pool of session tokens, and the unlocked session tokens are not currently used by the plurality of users and the locked session tokens are currently used by at least one of the plurality of users,
    wherein the other session pool component comprises another hash structure of the unlocked session tokens and the locked session tokens, and pairs in the form <key, value>, wherein the key represents a string of a session token and the value is for an associated session token, and wherein the session manager manages session tokens from the pool according to an identity of a user of the plurality of users, and the session manager is to:

receive a check out message including user credentials from the client application, wherein the user credentials identify the user of the plurality of users operating the client application;

in response to the received check out message, determine a session token from the hash structure of unlocked session tokens to assign to a session for the user;

remove the determined session token from the hash structure of unlocked session tokens and move the determined session token into the hash structure of locked session tokens; and send a token identifier (token ID) to the client application pointing to the determined session token, wherein the session token is operable to be used by the client application to point to a previously established session with the web service without re-establishing a new session.

2. The computer network according to claim 1, wherein the session token includes an encrypted string including a session ID, the user credentials, and a timestamp extracted from a user request message sent to initiate a session with the at least one web service.

3. A computer system for managing session tokens, the system comprising:

a processor; and a memory, the memory comprising code executable by the processor to implement a session token manager, the session token manger further implementing a user session pool component and another session pool component to manage a pool of session tokens for a plurality of users operating a client application, wherein the user session pool component implements a hash structure of unlocked session tokens from the pool of session tokens and a hash structure of locked session tokens from the pool of session tokens, and the unlocked session tokens are not currently used by the plurality of users and the locked session tokens are currently used by at least one of the plurality of users, wherein the other session pool component comprises another hash structure of the unlocked session tokens and the locked session tokens, and pairs in the form <key, value>, wherein the key represents a string of a session token and the value is for an associated session token, and wherein the session manager manages session tokens from the pool according to an identity of a user of the plurality of users, and the session manager is to:

receive a check out message along with user credentials from the client application, wherein the user credentials identify the user of the plurality of users operating the client application;

in response to the received check out message, determine a session token from the hash structure of unlocked session tokens to assign to a session for the user;

remove the determined session token from the hash structure of unlocked session tokens and move the determined session token into the hash structure of locked session tokens; and send a token identifier (token ID) to the client application pointing to the determined session token, wherein the session token is operable to be used by the client application to point to a previously established session with a web service without re-establishing a new session.

4. The computer system according to claim 3, wherein the session manager is to determine whether the determined session token is a valid session token in response to a determination that the session token has been used a number of times less than or equal to a pre-defined maximum usage value.

5. The computer system according to claim 3, wherein the session token includes an encrypted string including a session ID, the user credentials, and a timestamp extracted from a user request message sent to initiate a session with the web service.

6. A computer-implemented method for managing a pool of session tokens associated with a plurality of users operating a client application, the method comprising:

storing data structures comprising:

a hash structure of unlocked session tokens from the pool of session tokens;

a hash structure of locked session tokens from the pool of session tokens; and another hash structure comprising the unlocked session tokens, the locked session tokens, and pairs in the form <key, value>, wherein the key represents a string of a session token and the value is for an associated session token, wherein the unlocked session tokens are not currently used by the plurality of users and the locked session tokens are currently used by at least one of the plurality of users; and managing session tokens according to an identity of a user of the plurality of users, wherein managing the session tokens includes:

receiving, by a processor, a check out message including user credentials from a client application, wherein the user credentials identify the user of the plurality of users operating the client application;

determining, in response to receiving the check out message, a session token from the hash structure of unlocked session tokens to assign to a session for the user;

removing the determined session token from the hash structure of unlocked session tokens and move the determined session token into the hash structure of locked session tokens; and sending a token identifier (token ID) to the client application pointing to the determined session token, wherein the session token is operable to be used by the client application to point to a previously established session with a web service without re-establishing a new session.

7. The method according to claim 6, determining whether the determined session token is a valid session token to assign the determined session token to the session for the user.

8. The method according to claim 7, wherein the determined session token is determined to be valid if the determined session token has been used a number of times less than or equal to a pre-defined maximum usage value.

9. The method according to claim 6, wherein if the determined session token is not a valid session token, the token ID is empty.

10. The method according to claim 9, wherein the determined session token corresponding to the empty token ID is removed from the pool of session tokens.

11. The computer-implemented method according to claim 6, wherein the session token includes an encrypted string including a session ID, the user credentials, and a timestamp extracted from a user request message sent to initiate a session with the web service.

12. A non-transitory computer readable medium comprising computer readable instructions, which when executed by a processor, causes the processor to perform operations associated with managing a pool of session tokens associated with a plurality of users operating a client application, the operations comprising:
storing data structures comprising:
a hash structure of unlocked session tokens from the pool of session tokens;
a hash structure of locked session tokens from the pool of session tokens; and
another hash structure comprising the unlocked session tokens, the locked session tokens, and pairs in the form <key, value>, wherein the key represents a string of a session token and the value is for an associated session token,
wherein the unlocked session tokens are not currently used by the plurality of users and the locked session tokens are currently used by at least one of the plurality of users; and
managing session tokens according to an identity of a user of the plurality of users, including:
receiving a check out message including user credentials from a client application, wherein the user credentials identify the user of the plurality of users operating the client application;
determining, in response to receiving the check out message, a session token from the hash structure of unlocked session tokens to assign to a session for the user;
removing the determined session token from the hash structure of unlocked session tokens and move the determined session token into the hash structure of locked session tokens; and
sending a token identifier (token ID) to the client application pointing to the determined session token, wherein the session token is operable to be used by the client application to point to a previously established session with a web service without re-establishing a new session.

13. The non-transitory computer readable medium according to claim 12, wherein the computer readable instructions are to further cause the processor to perform operations comprising: determining whether the determined session token is a valid session token, wherein the determining includes determining whether the session token has been used a number of times less than or equal to a pre-defined maximum usage value.

14. The non-transitory computer readable medium according to claim 12, wherein the session token includes an encrypted string including a session ID, the user credentials, and a timestamp extracted from a user request message sent to initiate a session with the web service.

* * * * *

UNITED STATES PATENT AND TRADEMARK OFFICE
CERTIFICATE OF CORRECTION

| | | |
|---|---|---|
| PATENT NO. | : 9,058,214 B2 | Page 1 of 1 |
| APPLICATION NO. | : 13/409367 | |
| DATED | : June 16, 2015 | |
| INVENTOR(S) | : Riccardo Ragusa et al. | |

It is certified that error appears in the above-identified patent and that said Letters Patent is hereby corrected as shown below:

On the Title page:

The Foreign Application Priority Data number "11425051" should read "11425051.7".

Signed and Sealed this
First Day of December, 2015

Michelle K. Lee
*Director of the United States Patent and Trademark Office*